Patented Oct. 12, 1948

2,451,087

UNITED STATES PATENT OFFICE 2,451,087

METHOD OF RECONDITIONING BATTERY PLATES

Alva L. Hindall, Muncie, Ind., assignor to General Motors Corporation, Detroit, Mich., a corporation of Delaware No Drawing. Application December 1, 1944, Serial No. 566,253

5 Claims. (Cl. 136—165)

This invention relates to a method of rejuvenating or reconditioning negative plates of Faure type storage batteries.

An object of the invention is to provide a method of rejuvenating negative plates of a Faure type storage battery by immersing the plates in a rejuvenating solution which supplies an expander material to the plate paste.

A further object of the invention is to provide a method of rejuvenating negative plates wherein ingredients which were normally present in the paste are replaced by the rejuvenation procedure so that the plate is substantially in its original condition after the rejuvenation process has been completed.

Another object of the invention is to provide a method of rejuvenating negative plates wherein the sulfated negative plates are processed to remove the sulfate and likewise to remove antimony on a negative plate which has become deposited thereon through electro-deposition from the positive plate. In this manner the negative plate is brought back to substantially its original condition prior to impregnation thereof with expander solutions.

Further objects and advantages of the present invention will be apparent from the following description.

The use of expander materials in the negative plate paste of lead storage batteries has long been known to improve the life, increase the capacity and, in general, aid in the formation of improved plates over prior plates wherein no expander material was utilized. The expander is generally a porous material having the facility for holding large volumes of chemicals and capable of aiding in maintaining the battery plate paste in position.

An improved type of expander is disclosed and claimed in my copending application, Serial No. 552,681, filed September 4, 1944, which application is now abandoned. A similar expander is disclosed and claimed in my copending application, Serial No. 765,260, filed July 31, 1947, and now Patent No. 2,436,299, issued February 17, 1948, a continuation-in-part of application Serial No. 552,681. The expander shown in the first mentioned application is as follows:

| | Parts |
|---|---|
| Lignin bearing material | 20 to 40 |
| Carbon black | 4 to 12 |
| Alkali earth hydroxide | 9 to 30 |
| Alkali metal hydroxide | 3 to 13 |
| Lignone (waste sulfite liquor) | 6 to 38 |
| Water as required. | | and preferred quantities and ingredients are as follows:

| | Parts |
|---|---|
| Red oak sawdust | 34 |
| Carbon black | 8.5 |
| Barium hydroxide | 17 |
| Sodium hydroxide | 7 |
| Lignone | 34 |
| Water as required. | |

The expander disclosed in my Patent No. 2,436,299 is similar, but varies slightly in certain of the ingredients as follows:

| | Parts |
|---|---|
| Lignin bearing material | 15 to 40 |
| Carbon black | 4 to 15 |
| Alkali earth hydroxide | 9 to 30 |
| Alkali metal hydroxide | 3 to 13 |
| Lignone (waste sulfite liquor) | 10 to 50 |
| Water as required. | | and preferred quantities and ingredients are as follows:

| | Parts |
|---|---|
| Red oak sawdust | 20 |
| Carbon black | 10 |
| Barium hydroxide | 21 |
| Sodium hydroxide | 8 |
| Lignone (waste sulfite liquor) | 41 |
| Water as required. | |

These expander materials have been found to be particularly desirable when added to the negative plate paste, and batteries using plates which incorporate this material therein are markedly superior to batteries using any other types of expanders. It has been observed that the efficacy of expanders appears to decrease with time. Usually, however, the positive plates of the battery fail prior to the time that the negative plates reach a point where they can no longer be used so that this observation has heretofore been unimportant.

With this factor in mind, I have discovered that the negative plates can be reused a number of times with new sets of positive plates provided the expander in the negative plates is rejuvenated and brought back to its original state of activity. This can be done quite easily by the method hereinafter described and is particularly applicable for use with the plates including any of the expanders described herein. However, it is to be understood that the invention is not limited to use with any particular type of negative plate such as noted in my copending application, but that the method may be used in connection with any negative plate wherein the paste is sufficiently porous to absorb a substantial quantity of the rejuvenating solutions. In this connection, the plates may have been originally made with other types of expanders, such as wood sawdust, ligno sulfonic acid, waste sulfite liquor, cellulose in the porous state and in fact any of the normal expanders which create porosity in the plate or they can be plates which have never had any expander therein, providing the paste is of sufficient porosity to soak up and retain appreciable quantities of the rejuvenating solutions. Thus the invention herein described is sufficiently broad in scope to permit its use with any type of negative plate wherein the plate paste will absorb, for example, approximately .5 of 1% by weight of the plate paste of the rejuvenating solutions. Therefore in the description to follow, it is to be understood that reference to the negative plates is made in the broad sense and is not limited to any particular type of negative plate.

The method of rejuvenating the negative plates consists in removing the battery acid and filling the battery with water and allowing it to stand for about two hours, after which the water is removed and 5 to 10% solution of an equal mixture of sodium sulfate and potassium tartrate is placed in the battery and the battery is given a normal charge of six amperes per hour for eighteen hours. In place of sodium sulfate and potassium tartrate, other salts of alkali metals may be used, for example, potassium, magnesium, caesium, rubidium, lithium, etc. After the battery has been charged, it is then preferably discharged at the same rate, namely, six amperes per hour for about fifteen minutes. This charge and discharge cycle can be repeated two or three times if desired and will improve the result. However, a single charge and discharge, as noted, is sufficient to greatly improve the condition of the plate. This charge and discharge cycle is a conditioning process wherein the sodium sulfate causes a reduction of the lead sulfate on the plate and helps to convert the same to metallic lead. The potassium tartrate combines with antimony which normally plates out on the negative plate by electro depositions from the positive plate. The antimony salt of the tartaric acid is soluble and in this manner, the antimony is removed from the plate. This is an important step since antimony on the negative plate causes self-discharge of the plate. The conditioning treatment also acts to reduce the particle size of the lead which particle size is maintained during operation of the battery due to the presence of expanders to be added hereinafter. After the charge and discharge, the battery is emptied of solutions and is dismantled. The negative plates are washed with water to remove any acid and are dried in order to oxidize the metallic lead. The plates are then immersed in a solution of barium hydroxide (about 5%) for a period of time sufficient to cause the plates to soak up the solution. This time varies with the porosity of the plates but in all instances, should be completed in about five minutes. The plates are then removed from the solution and dried and are next immersed in a solution of waste sulfite liquor (about 5%) where they are allowed to remain for a time sufficient to absorb the solution, usually about ten to twenty minutes, and then are removed and dried. These plates now include the rejuvenating ingredients of barium hydroxide and waste sulfite liquor and may be assembled with a new set of positive plates and replaced in the battery. After the battery has been assembled, it is of course necessary to form the negative plates. This process is similar to the process utilized in forming the plates in a new battery and consists briefly in filling the battery with sulfuric acid of a suitable specific gravity and then giving the battery a normal formation charge in the order of seven amperes for a prolonged period of time, usually about forty-two hours.

In place of barium hydroxide, any of the alkali earth hydroxides, such as strontium and calcium hydroxides, can be used. Likewise in place of waste sulfite liquor, solutions of ligno or lignin sulfonic acids or soluble lignin such as lignin in caustic solution can be used with good results. It is apparent that either the hydroxide expander or the lignin expander will produce partially satisfactory results so that when introducing expander material, either one of these ingredients may be used alone. In this case, the result will not be of optimum character, but it will be found that the plates will be superior to new negative plates which have no expander therein. Therefore, such a modification is to be understood to be within the scope of this invention.

The life of positive plates in a fifteen-plate battery is approximately 8,000 ampere hours on an overcharge test. Negative plates rejuvenated in accordance with the present invention will have a useful life of over 30,000 ampere hours on an over-charge test or stated differently, the negative plates will have at least three times the life of the positive plates and therefore can be used in three battery assemblies, wherein three new sets of positive plates are worn out before the replacement of the negative plates is required.

This method therefor permits a tremendous saving in time and material in the manufacture of storage batteries, since it is only necessary to follow the procedure herein noted and supply a new set of positive plates in order to bring the battery back to its original operating condition. It is understood that while the expander solutions set forth herein are preferred, that results can be obtained by using other expander solutions, and while not preferred, these other expanders will cause rejuvenation of the negative plates to the extent that they can be reused with good results, although not optimum results.

While the embodiments of the present invention as herein disclosed, constitute preferred forms, it is to be understood that other forms might be adopted, all coming within the scope of the claims which follow.

What is claimed is as follows:

1. The method of rejuvenating negative battery plates of worn-out storage batteries comprising the steps of, washing the plates to remove all old acid and the like, charging the plates in a 5 to 10% solution containing equal parts of alkali metal salts of sulfates and tartrates for converting the lead sulfate in the plates to spongy lead, replacing the exhausted expander material in the plates with new expander material by immersing the plates in a solution of the expander, drying the plates, and then assembling the plates with new positive plates for use in a battery.

2. The method of rejuvenating negative battery plates of worn-out storage batteries comprising the steps of, washing the plates to remove all old acid and the like, charging the plates in a 5 to 10% solution containing equal parts of alkali metal salts of sulfates and tartrates for converting the lead sulfate in the plates to spongy lead, filling the pores of the plates with barium hydroxide and waste sulfite liquor, and then drying the plates, whereby the plates are rejuvenated and may be reassembled with a new set of positive plates.

3. The method of rejuvenating negative plates of a Faure type storage battery, comprising the steps of, cleaning the negative plates of a worn-out storage battery, charging and discharging the battery while the battery solution consists of a 5% to 10% solution of substantially equal parts of sodium sulfate and potassium tartrate, dismantling the battery, washing and drying the negative plates, immersing said plates in a 5% barium hydroxide solution for a time sufficient to permit absorption of said solution, drying the plates, immersing said plates in a 5% waste sulfite liquor solution and permitting them to remain in said solution for from ten to twenty minutes, drying the plates, and finally assembling the plates with new positive plates in the battery.

4. The method of rejuvenating negative battery plates of worn-out storage batteries comprising the steps of, charging and discharging the plates in a solution wherein one of the ingredients produces a soluble antimony salt with the antimony on the surface of the negative plates which has been plated out thereon from the positive plates for removing antimony from the negative plates and simultaneously reducing the sulfate thereon to substantially pure lead, and then introducing an expander material into the negative plates by immersing the negative plates in a solution containing expander material, and finally assembling the negative plates with a new set of positive plates for use in a battery.

5. The method of rejuvenating negative plates of a worn out Faure type storage battery, comprising the steps of, charging and discharging the storage battery with the original plates therein while the battery solution consists of a 5 to 10% solution of an alkali metal sulfate and a salt which will produce a soluble antimony compound with the antimony on the surface of the negative plates which has been plated out thereon from the positive plates, dismantling the battery, washing and drying the negative plates, immersing the negative plates in a metal hydroxide solution of about 5% strength wherein the metal is selected from the group consisting of barium, strontium and calcium for a time sufficient to permit absorption of said solution into the plates, drying the plates, immersing said plates in a solution of a soluble lignin compound wherein the strength of the solution is about 5% for a time sufficient to permit absorption of the solution into the plates, drying the plates, and finally assembling the plates with a new set of positive plates for subsequent use in a battery.

ALVA L. HINDALL.

REFERENCES CITED

The following references are of record in the file of this patent:

UNITED STATES PATENTS

| Number | Name | Date |
| --- | --- | --- |
| 916,576 | Morrison | Mar. 30, 1909 |
| 990,661 | Luckow | Apr. 25, 1911 |
| 1,817,846 | Reinhardt | Aug. 4, 1931 |
| 2,073,734 | Downing | Mar. 16, 1937 |

FOREIGN PATENTS

| Number | Country | Date |
| --- | --- | --- |
| 26,652/30 | Australia | May 12, 1931 |
| 149,196 | Switzerland | Nov. 2, 1931 |